UNITED STATES PATENT OFFICE.

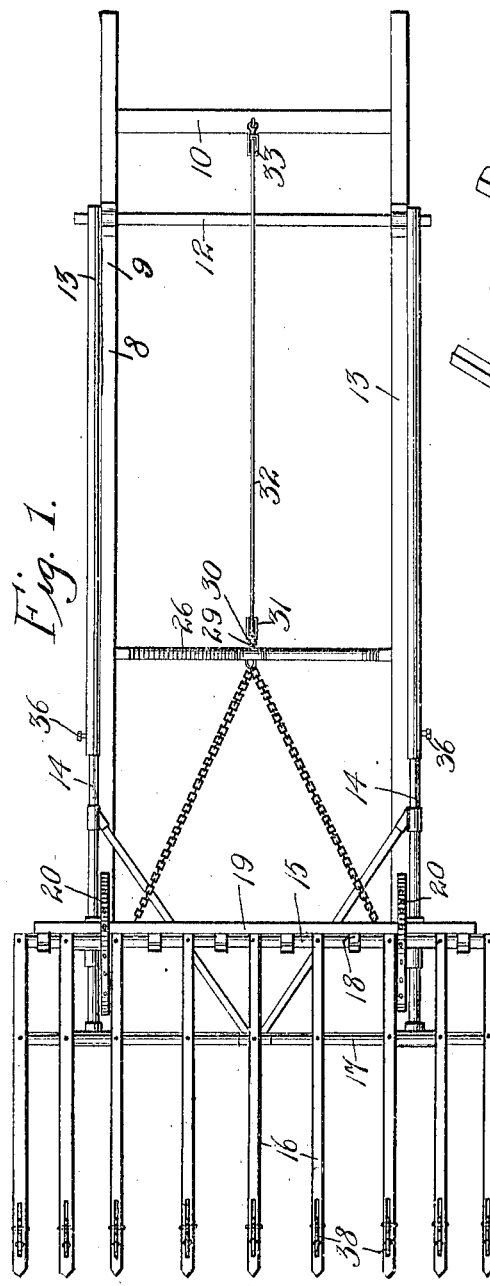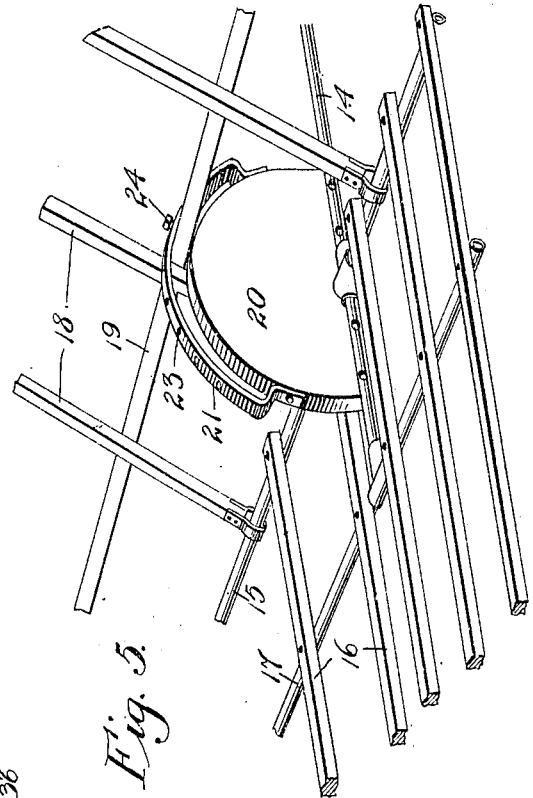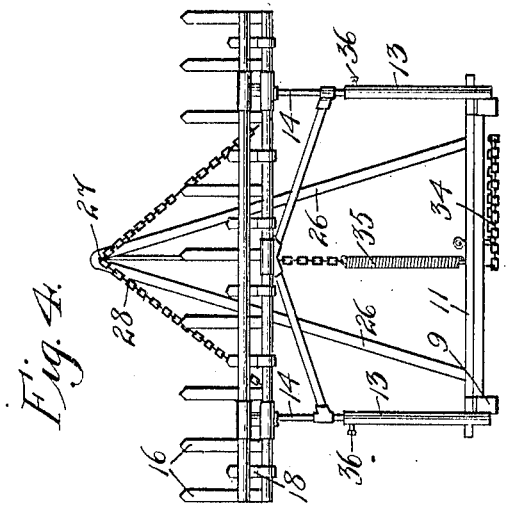

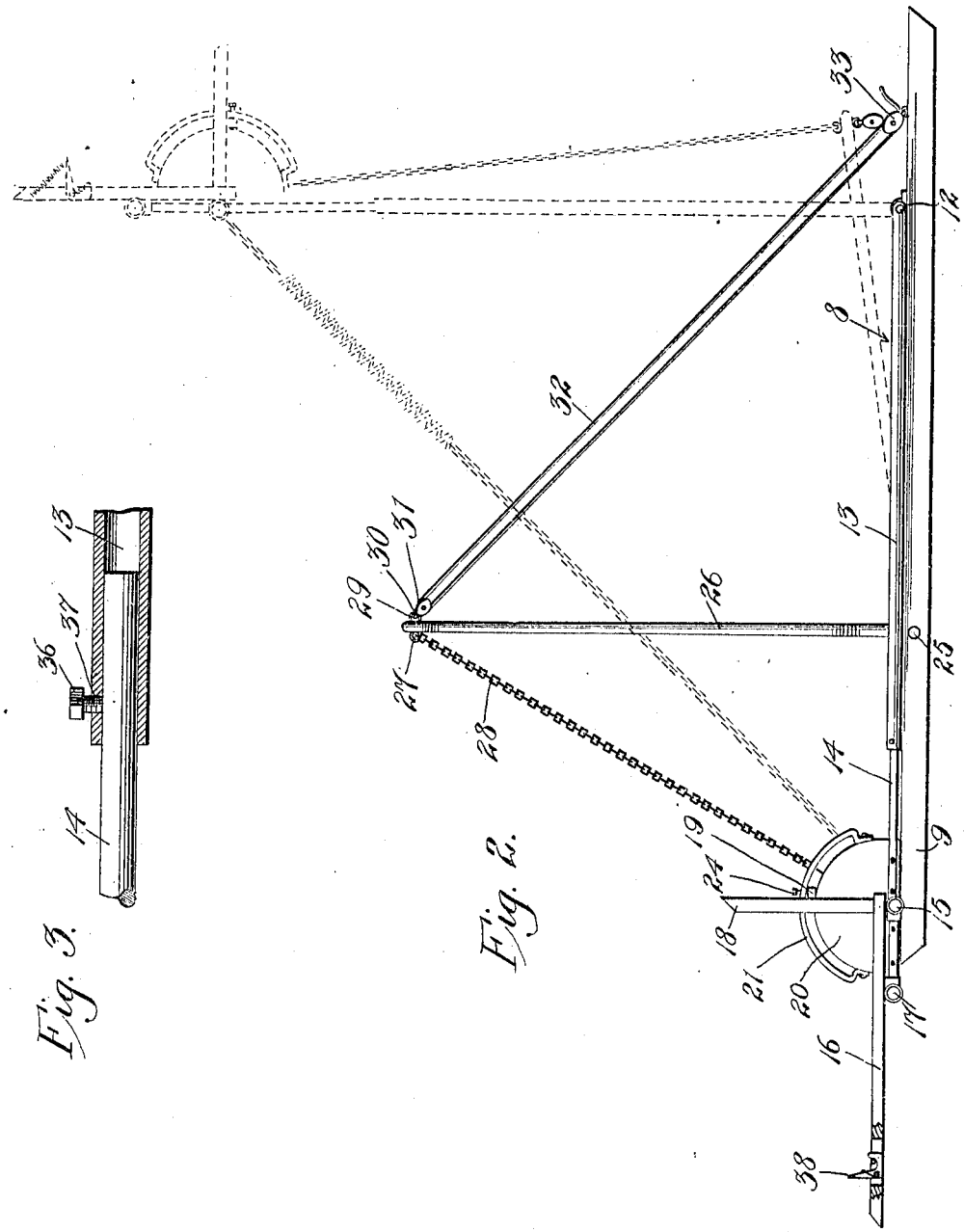

CHARLES B. SINGLEY AND GEORGE W. SINGLEY, OF LEWISTOWN, MONTANA.

HAY-STACKER.

949,161.  Specification of Letters Patent.  Patented Feb. 15, 1910.

Application filed January 4, 1909. Serial No. 470,621.

*To all whom it may concern:*

Be it known that we, CHARLES B. SINGLEY and GEORGE W. SINGLEY, citizens of the United States, residing at Lewistown, in the county of Fergus, State of Montana, have invented certain new and useful Improvements in Hay-Stackers; and we do hereby declare the following to be a full, clear, and exact description of the invention, such as will enable others skilled in the art to which it appertains to make and use the same.

The invention relates to a hay-ricker or stacker and more particularly to the class of devices for raising hay or other material.
The primary object of the invention is the provision of a device of this character having a fork, the front teeth of which are fixed and the back teeth being capable of angular adjustment.
Another object of the invention is the provision of a hay-ricker comprising a fork, swinging arms carrying said fork which arms are extensible to lengthen or shorten the throw of said arms, a base supporting the arms and fork and means for automatically resetting forks after having been swung in one direction.

The invention consists in other certain novel features of construction, combination and arrangement of parts which will be hereinafter more fully described and illustrated in the accompanying drawings which disclose the preferred form of embodiment of the invention as brought out in the appended claim.

In the drawings: Figure 1 is a top plan view of the invention. Fig. 2 is a side elevation showing the device in position to receive material prior to discharging it upon a stack, and showing in dotted lines the discharge position. Fig. 3 is a fragmentary sectional view of one swinging arm showing the manner of longitudinal adjustment thereof. Fig. 4 is a front elevation of the invention.
Fig. 5 is a detail perspective view of the fork showing the back teeth adjustable.

Similar reference characters indicate corresponding parts throughout the several views in the drawings.
In the drawings, the numeral 8 designates generally the main supporting frame or base comprising spaced parallel side beams forming runners 9 the same united at their forward ends by a front cross bar 10 and at their rear ends by a rear cross bar 11 and a slight distance removed from the said front cross bar and journaled in the side beams is a shaft or rod 12 the latter pivotally supporting swinging tubes or pipes 13 into which are adapted to telescope extensible arms or bars 14 the same having fixed thereto a cross rod 15 supporting a fork including a plurality of outwardly projecting front fingers or teeth 16 the latter held stationary by a cross strip 17 connected thereto and to the outer extremities of the extensible arms or bars 14. Pivotally connected to the cross rod 15 are the inner ends of rear or back fingers or teeth 18 which are held in spaced relation to each other and united by a cross strip 19 connected thereto. Secured to the outer ends of the arms or bars 14 are curved plates 20 upon which are mounted loops 21 in which is freely movable the cross strip 19 the latter containing openings adapted to be brought into register with openings 23 to receive locking pins 24 so as to hold the latter or back fingers in various adjusted positions.

Journaled in the side beams or runners 9 of the base at a point intermediate its ends is a pivot rod 25 to which are connected the lower ends of a pair of converging uprights 26 the latter united at their upper meeting ends and in which latter is mounted an eye 27 through which is trained a pull chain 28 the ends of which are connected to the cross rod 15. Mounted at the upper meeting ends of the uprights 26 is an eye 29 engaged by a hook 30 carrying a pulley block 31 over which is trained a fall or cable 32 the latter also trained over a pulley block 33 connected centrally to the front cross bar 10 and the free end of the fall or cable 32 is adapted to be attached to any suitable power for raising the fork.

Fixed centrally to the rear cross bar 11 is a chain 34 having connected thereto a coiled resetting spring 35 the latter connected centrally to the cross rod 15 to automatically return the fork from a raised to a lowered position. To lock the extensible arms or bars 14 in adjusted position there are provided locking pins 36 which pass through registering openings 37 contained in the said arms or bars 14 and pipes 13 respectively. It is obvious that by the adjustment of the extensible arms or bars 14 the length of throw of the swinging pipes for elevating the fork can be regulated as the occasion may demand.

Mounted near the free ends of the front teeth or fingers 16 of the fork are spring controlled triggers or members 38 which latter are adapted to permit material to be gathered by the fork, they will also prevent the said material from slipping from the said fork after having been gathered thereon.

In using the device the fork is swung downward into position adjacent the rear cross bar 11 by the resetting spring 35 and a quantity of hay or other material to be stacked is placed upon the fork between the front and back piece thereof so that the bulk of material can be elevated and swung to a predetermined point for the subsequent stacking thereof. Horses can be connected to the free end of the cable 32 and when driven forward will swing the uprights 26 downward, drawing on the pull chain 28 to exert an upward pull upon the fork and the swinging pipes or tubes 19 will carry the said fork to a predetermined elevation where the load or bulk of material will be discharged therefrom. As soon as the bulk or load of material has been discharged in this manner the fork will be automatically returned to its original position by the resetting spring 35 with the assistance of gravity. It is apparent the back teeth 18 of the fork can be readily adjusted by the clamps 21 to dispose the same at various angles with respect to the front teeth of the fork, and this is done to overcome adverse winds.

What is claimed is—

The combination with a base, of swinging telescopical tubes pivotally connected thereto, a cross strip connecting the free ends of the outermost tubes, a cross rod secured adjacent said cross strip, a fork having a plurality of fingers provided with triggers adjacent their outer end secured to said cross strip and cross rod, a plurality of adjustable back fingers pivotally secured to said cross bar, curved plates secured to the outermost tubes adjacent said cross rods, spaced loops carried by said plates, a cross strip connecting said back fingers and engaging said loops, means for elevating the forks and means for automatically lowering the same.

In testimony wherof, we affix our signatures, in presence of two witnesses.

CHARLES B. SINGLEY.
GEORGE W. SINGLEY.

Witnesses:
EDWARD A. HOFLAND,
HARRY E. SHEPHERD.